A. MECONI.
WINDOW CLEANER.
APPLICATION FILED JULY 1, 1921.
1,423,239.
Patented July 18, 1922.
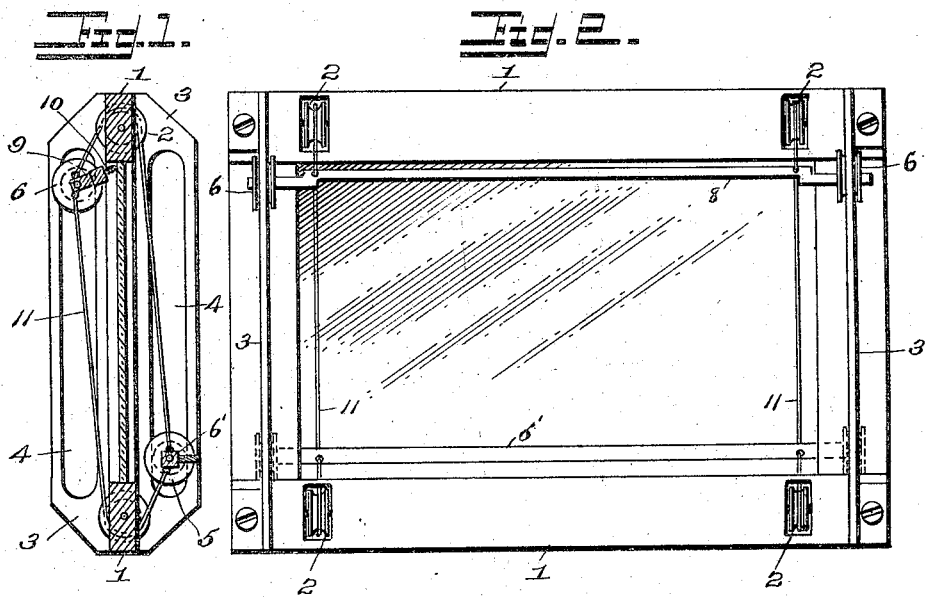
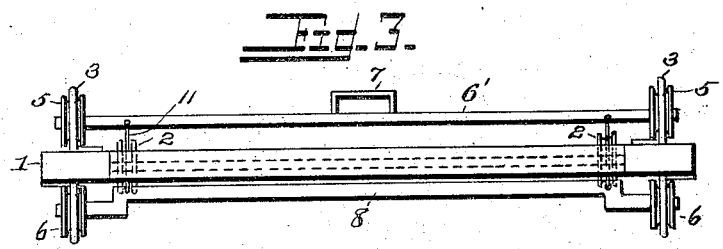
Inventor
Aberto Meconi
By Howard R. Eccleston
Attorney

UNITED STATES PATENT OFFICE.

ALBERTO MECONI, OF MUNICH, GERMANY, ASSIGNOR TO TACOPE MECONI, OF CUMBERLAND, MARYLAND.

WINDOW CLEANER.

1,423,239.      Specification of Letters Patent.      Patented July 18, 1922.

Application filed July 1, 1921. Serial No. 481,816.

*To all whom it may concern:*

Be it known that I, ALBERTO MECONI, a subject of the King of Italy, and residing at Munich, Bayern, Germany, have invented certain new and useful Improvements in Window Cleaners, of which the following is a specification.

My invention relates to window cleaners for street cars, railway cars, automobiles and the like, and has for its object to provide such a device which may be easily and quickly applied to the ordinary windows now in use.

Another object of the invention is the provision of a window cleaner which when operated from the interior of the car or other vehicle, will clear the outside of the window of snow, rain, sleet, etc.

Another object of the invention is to provide such a device which is neat in appearance and one which is made of few parts.

Other objects of the invention will appear from the following description when taken in connection with the accompanying drawings, in which:

Figure 1 is a vertical section through the window and cleaner.

Figure 2 is a front elevation thereof; and

Figure 3 is a plan view.

Referring to the drawing in detail, the numeral 1 designates the window frame, which has suitably journaled therein four guide or pulley wheels 2. Two of these wheels being provided at the opposite ends of the upper frame member and the other two are similarly located in the lower frame member.

Guide members 3—3 are also attached to the window frame and have formed therein elongated openings 4, which provide tracks for the additional wheels or rollers 5 and 6. These guide members are four in number, two being located on the outside of the frame and two on the inside thereof.

The rollers 5 are located in the slots of the inner guide members and are suitably connected by the transverse rod 6', provided with a handle 7. The rollers 6, which are located in the slots of the exterior guide members 3, are connected by the transverse rod 8, the latter having attached thereto any form of window cleaner 9 provided with a wiper strip of rubber, felt or the like 10.

Cables or cords 11 are attached to each of the transverse rods 6' and 8 at the ends thereof, after first being led over the pulley wheels 2.

To operate the device it is only necessary to grasp the handle 7 and move it up or down. This movement of the rod is transmitted through cables 11 and pulley wheels 2, to the cleaner 9, and any snow, rain, etc. which may have collected on the window pane is readily removed.

It will be understood, of course, that my device can be operated as well, if the parts are all moved through an angle of 90°, so that the cleaner 10 will extend vertically and be moved from side to side instead of up and down.

In accordance with the patent statutes, I have described what I now believe to be the best embodiment of the invention, but I do not wish to be understood thereby as limiting myself or the scope of the invention, as many changes and modifications may be made without departing from the spirit of the invention, all such I aim to include in the scope of the appended claim.

What I claim as new and desire to secure by Letters Patent is:

A window cleaner comprising pulley wheels mounted at the top and bottom of the window frame, substantially flat, rectangular guide members extending at right angles to the window frame on opposite sides thereof and provided with elongated openings, rollers positioned in said elongated openings, a rigid connection between the rollers on each side of the frame, cables joined to said rigid connections, and a wiper carried by one of said rigid connections.

ALBERTO MECONI.